United States Patent [19]
Ando et al.

[11] Patent Number: 5,546,410
[45] Date of Patent: Aug. 13, 1996

[54] SEMICONDUCTOR MEMORY DEVICE WITH ERROR SELF-CORRECTION SYSTEM STARTING PARITY BIT GENERATION/ERROR CORRECTION SEQUENCES ONLY WHEN INCREASE OF ERROR RATE IS FORECASTED

[75] Inventors: Manabu Ando; Junji Monden, both of Tokyo, Japan

[73] Assignee: NEC Corporation, Tokyo, Japan

[21] Appl. No.: 284,204

[22] Filed: Aug. 2, 1994

[30] Foreign Application Priority Data

Aug. 3, 1993 [JP] Japan ................................. 5-209958

[51] Int. Cl.⁶ .................................................. G11C 29/00
[52] U.S. Cl. ........................................... 371/40.2; 371/501
[58] Field of Search ............................... 371/37.4, 40.1, 371/40.2, 40.3, 40.4, 50.1

[56] References Cited

U.S. PATENT DOCUMENTS 4,561,095 12/1985 Khan ........................ 371/40.1
4,706,249 11/1987 Nakagawa et al. ................ 371/40.1
4,768,193 8/1988 Takemae .......................... 371/10.3
4,993,030 2/1991 Krakauer et al. .................. 371/40.1
5,297,148 3/1994 Harari et al. ..................... 371/10.2
5,359,570 10/1994 Hsu et al. ...................... 365/230.01
5,455,939 10/1995 Rankin et al. ................... 395/182.04

FOREIGN PATENT DOCUMENTS 62-35199   7/1987   Japan .
62-35198   7/1987   Japan .
2-150000   5/1990   Japan .
2-242453   9/1990   Japan .

*Primary Examiner*—Stephen M. Baker
*Attorney, Agent, or Firm*—Foley & Lardner

[57] ABSTRACT

A semiconductor memory device has a built-in error correction system for correcting undesirably inverted data bits, and the built-in error correction system starts a parity bit generating sequence and an error correcting sequence only when increase of error rate is forecasted, thereby increasing the access speed without sacrifice of the reliability.

4 Claims, 5 Drawing Sheets

SEMICONDUCTOR MEMORY DEVICE WITH ERROR SELF-CORRECTION SYSTEM STARTING PARITY BIT GENERATION/ERROR CORRECTION SEQUENCES ONLY WHEN INCREASE OF ERROR RATE IS FORECASTED

FIELD OF THE INVENTION

This invention relates to a semiconductor memory device and, more particularly, to a semiconductor memory device with a built-in error correction circuit.

DESCRIPTION OF THE RELATED ART

A typical example of the semiconductor memory device with the built-in error correction circuit is disclosed in Japanese Patent Publication of Examined Application No. 62-35198, and Japanese Patent Publication of Examined Application No. 62-35199, Japanese Patent Publication of Unexamined Application No. 2-150000 respectively disclose other examples of the semiconductor memory device. The error correction technology disclosed in Japanese Patent Publication of Examined Application No. 62-35198 is described hereinbelow with reference to FIGS. 1 and 2.

Assuming now that sixteen memory cells M11 to M14, M21 to M24, M31 to M34 and M41 to M44 are arranged in rows and columns as shown in FIG. 1, the four rows of memory cells are respectively associated with four horizontal parity cells HPC1 to HPC4, and the four columns of memory cells are associated with four vertical parity cells VPC1 to VPC4. If the memory cells M12 to M14, M22 to M24, M32 to M34 and M42 to M44, the horizontal parity cells HPC2 to HPC4 and the vertical parity cells VPC2 to VPC4 are imaginarily moved along associated arrows, respectively, the memory cells M11 to M44, the horizontal parity cells HPC1 to HPC4 and the vertical parity cells VPC1 to VPC4 form a queue as shown in FIG. 5. In other words, the matrix shown in FIG. 1 is equivalent to the single queue shown in FIG. 2, and a parity check sequence available for the matrix is effective against an error bit incorporated in the memory cells M11 to M44 in the queue shown in FIG. 2.

In the prior art semiconductor memory device disclosed in Japanese Patent Publication of Examined Application No. 62-35198, memory cells coupled to each word line are partially assigned to data bits, partially to the horizontal parity bits and partially to the vertical parity bits as shown in FIG. 2, and an associated error correction circuit corrects an error bit detected through a conventional parity check sequence.

The other Japanese Patent Publication of Examined/Unexamined Applications aim at reduction of the total memory cells, and the disclosed error correcting sequences are analogous to that disclosed in Japanese Patent Publication of Examined Application No. 62-35198.

The prior art semiconductor memory device starts the error correcting sequence by energizing, and bits "0" are written into all of the memory cells and the horizontal/vertical parity cells.

When a new data bit is supplied from an external source to the prior art semiconductor memory device together with an address signal indicative of the address assigned to a memory cell for storing the new data bit, the semiconductor memory device starts a write-in sequence combined with the error correcting sequence. In the write-in/error correcting sequences, the new data bit is temporarily stored, and the data bits stored in the two memory cell groups including the selected memory cell are read out therefrom. Subsequently, parity information obtained from the memory cell groups is compared with the parity information stored in the parity cells to see whether or not the data bit read out from the selected memory cell is correct. If the data bit stored in the selected memory cell is undesirably inverted, the error data bit is corrected.

Thereafter, the corrected data bit is compared with the new data bit, and the parity bits are changed, if necessary. Finally, the new data bits is written into the selected memory cell.

If a data bit stored in the memory cell is accessed, the semiconductor memory device starts a read-out sequence also associated with error correcting sequence, and the error correction in the read-out sequence is analogous to the error correction in the write-in sequence.

The prior art semiconductor memory device carries out the error correction sequence in all the write-in sequences and in all the read-out sequences.

In the static random access memory device incorporated in a handy terminal disclosed in Japanese Patent Publication of Unexamined Application No. 2-242453, parity bits are provided for the memory cells in a different manner from those of the above described examples. Namely, only horizontal parity cells are provided for the memory cells assigned to rewritable data bits, and both horizontal and vertical parity cells are provided for the memory cells assigned to program data bits.

While the handy terminal is being powered off, a backup power source keeps the program data bits and the rewritable data bits. However, a soft error tends to take place under a low potential level supplied from the backup power source. In order to correct the error bit, the error correction sequence is carried out for the program data bits and the rewritable data bits in all the read-out sequences after the handy terminal is powered on.

However, a problem is encountered in the prior art semiconductor memory device in that the error correcting sequence prolongs the total time period consumed in each data write-in and each data access. If the memory cells are divided into a larger number of memory cell groups, the error correction sequence is completed within shorter time period, and shortens the total time period. However, the larger number of memory cell groups require a larger number of parity cells, and the larger number of parity cells occupy additional real estate so that the semiconductor chip is enlarged. Moreover, even if the error correction sequence shortens the time period, the time period for the write-in and the data access is still longer than that of a semiconductor memory device without the error correction circuit.

SUMMARY OF THE INVENTION

It is therefore an important object of the present invention to provide a semiconductor memory device with en error correction circuit which shortens time period for a data write-in and a data read-out without sacrifice of reliability.

The present inventor noticed that error bits were liable to be produced in the memory cells under a low power voltage. While the semiconductor memory device was being powered at 5 volts, the error rate was not greater than 1 Fit or $10^{-9}$/hour. However, if the power voltage was stepped down to 2 volts, the error rate was increased a thousand times. For this reason, the present inventor concluded that the parity bit generation and the error correction had to be carried out only when increase of the error rate was forecasted. In other words, the parity bit generation and the error correction were omissible in the read/write sequences under standard conditions.

To accomplish the object, the present invention proposes to carry out a parity generation and an error correction only when is requested.

In accordance with the present invention, there is provided a semiconductor memory device for selectively entering into a standard mode and an error correction mode comprising a) a memory cell array having a plurality of addressable memory cells for respectively storing data bits, and forming a plurality of memory cell groups, the data bits being repeatedly rewritable and accessible from the outside of the semiconductor memory device without an error correction in the standard mode; b) a plurality of addressable status cells selectively associated with the plurality of memory cell groups for respectively storing inspection bits indicative of correct states of the data bits stored in the plurality of memory cell groups; c) an addressing system selectively making the plurality of addressable memory cells writable and readable in the standard mode, and selectively making the plurality of memory cell groups and the plurality of addressable status cells readable and the plurality of addressable memory cells writable in the error correcting mode; d) an interface unit enabled in the standard mode, and operative to receive new data bits from the outside and to deliver the data bits read out from the memory cell array to the outside; e) an inspecting and correcting system operative to see whether or not at least one data bit is inverted in the memory cell through comparison of the correct states with current states of the data bits respectively stored in the plurality of memory cell groups in the error correcting mode, the inspecting and correcting system being further operative to correcting the at least one data bit in the error correcting mode; and f) a mode discriminator coupled to a port changeable in status by the outside of the semiconductor memory device, and operative to discriminate the status of the port to see whether to cause the semiconductor memory device to enter into the error correcting mode.

BRIEF DESCRIPTION OF THE DRAWINGS

The features and advantages of the semiconductor memory device according to the present invention will be more clearly understood from the following description taken in conjunction with the accompanying drawings in which.

DESCRIPTION OF THE PREFERRED EMBODIMENT

Figure 1:
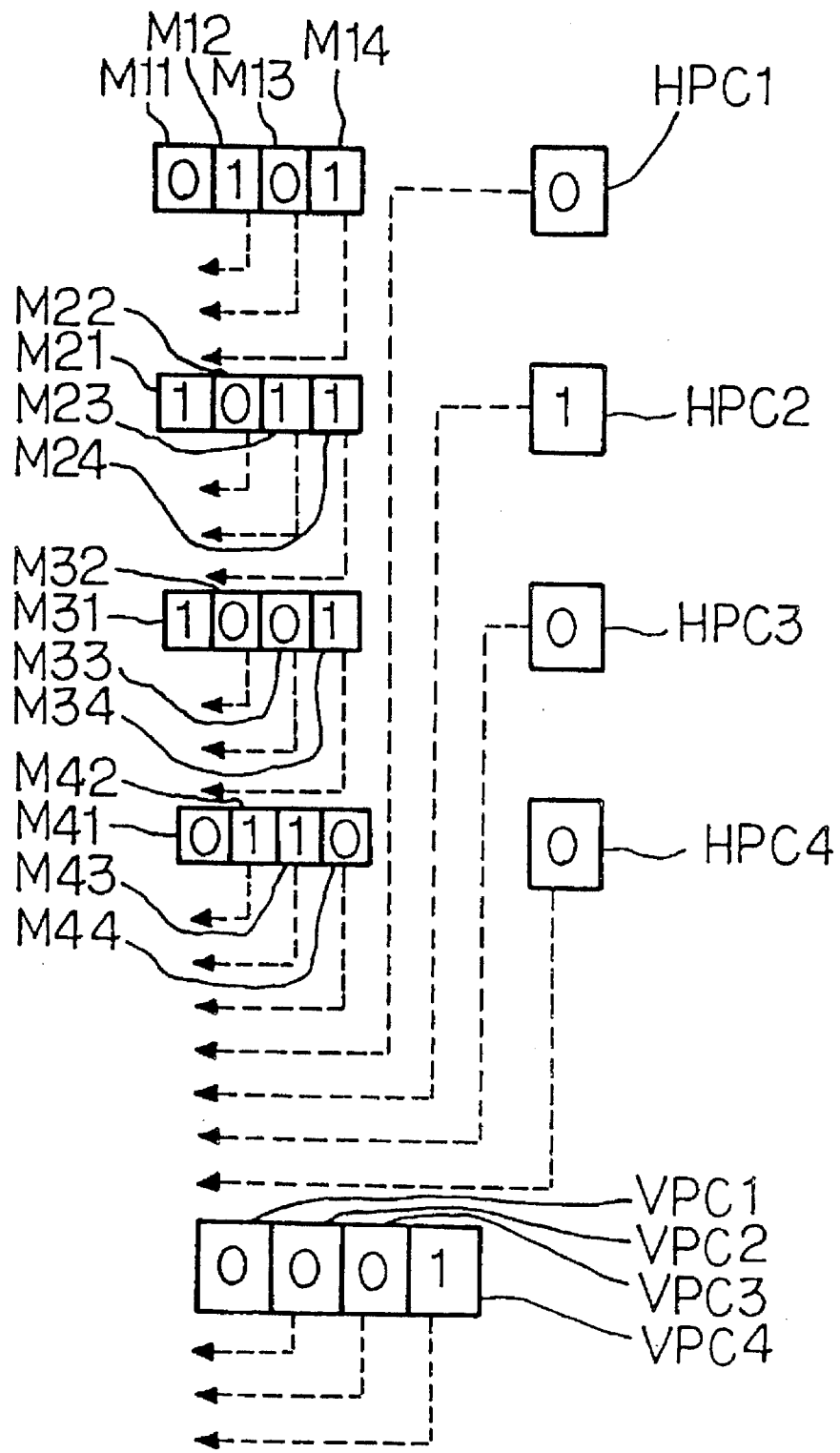
FIG. 1 is a view showing the memory cell matrix associated with the horizontal and vertical parity cells.
Figure 2:
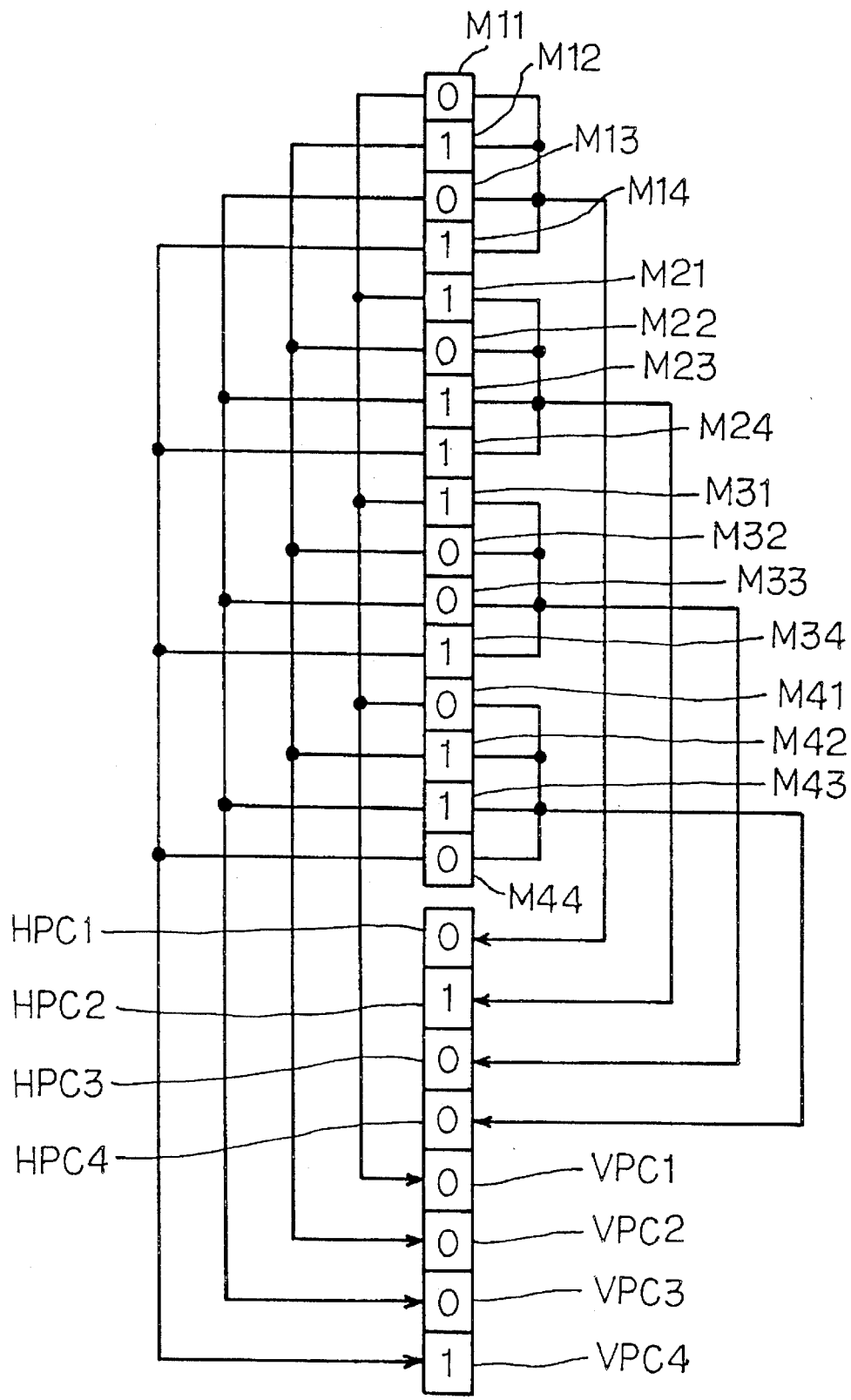
FIG. 2 is a view showing the queue of memory cells equivalent to the memory cell matrix shown in FIG. 1.
Figure 3:
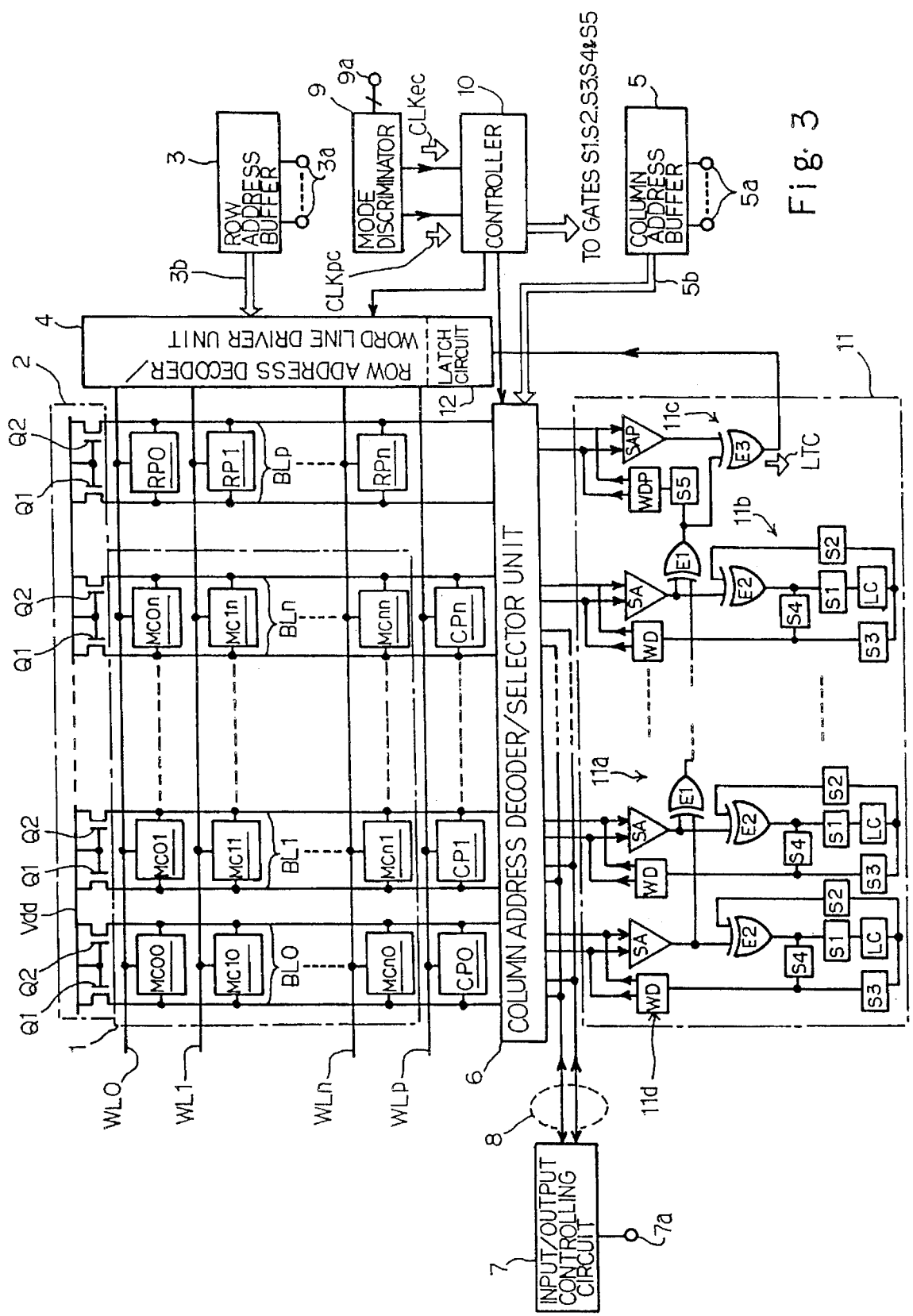
FIG. 3 is a block diagram showing the arrangement of a semiconductor static random access memory device according to the present invention.

Referring to FIG. 3 of the drawings, a semiconductor static random access memory device comprises a memory cell array 1 associated with horizontal parity cells RP0 to RPn and vertical parity cells CP0 to CPn, a plurality of word lines WL0, WL1, WLn and WLp and a plurality of digit line pairs BL0, BL1, BLn and BLp. A plurality of memory cells MC00 to MCnn are incorporated in the memory cell array 1, and are arranged in rows and columns. Though not shown in the drawings, a flip-flop circuit associated with two enhancement type switching transistors may form in combination each of the memory cells MC00 to MCnn, the horizontal parity cells RP0 to RPn and the vertical parity cells CP0 to CPn. Data bits and parity bits are stored in the flip flops of the memory cells MC00 to MCnn and the flip flops of the horizontal/vertical parity cells RP0-RPn/CP0-CPn in the form of potential difference, and current passing through the flip flops maintain the potential differences. The horizontal parity cells RP0-RPn and the vertical parity cells CP0-CPn serve as a plurality of addressable status cells.

The semiconductor static random access memory device selectively enters into a standard mode, a parity bit generating mode and an error correcting mode. The parity bit generating mode is corresponding to an inspection bit generating mode.

The standard mode has a write-in phase for a write-in sequence and a read-out phase for a read-out sequence. A new data bit is written into one of the memory cells MC00 to MCnn through the write-in sequence, and a data bit stored in the memory cell 1 is accessed through the readout sequence.

In the parity bit generating mode, parity bits are produced from the data bits stored in the memory cell array 1, and are written into the horizontal and vertical parity cells RP0 to RPn and CP0 to CPn.

On the other hand, if the semiconductor static random access memory device enters into the error correction mode, the data bits stored in the memory cell array 1 are read out for a parity check, and error data is corrected, if any is detected.

The semiconductor static random access memory device according to the present invention enters into the parity bit generating mode and the error correction mode only when these modes are requested. An external device may request the parity bit generation before increase of error rate and the error correction after recovery therefrom. A predetermined circumstance such as, for example, a power down requests the parity bit generation and the error correction.

The rows of memory cells MC00–MC0n/MC10–MC1n/. . . /MCn0–MCnn are respectively associated with the horizontal parity cells RP0 to RPn, and the word lines WL0 to WLn are associated with the respective rows of memory cells MC00–MCnn and the respective horizontal parity cells RP0 to RPn. The word line WLp is associated with the row of vertical parity cells CP0 to CPn. Each of the word lines WL0 to WLn and WLp is coupled to the gate electrodes of the enhancement type switching transistors incorporated in the associated memory cells and the horizontal parity cell or to the gate electrodes of the enhancement type switching transistors of the vertical parity cells. In this instance, the rows of memory cells MC00–MC0n/MC10–MC1n, . . . /MCn0–MCnn serve as a plurality of memory cell groups.

The columns of memory cells MC00–MCn0/ MC01–Mcn1 . . . /MC0n–MCnn are respectively associated with the vertical parity cells CP0–CPn, and the digit line pairs BL0 to BLn and BLp are associated with the respective columns of memory cells MC00 to MCnn and the respective vertical parity cells CP0 to CPn. Each of the digit line pairs BL0 to BLn is coupled to the drain nodes of the enhancement type switching transistors of the associated memory cells and to the drain nodes of the enhancement type switching transistors of the associated vertical parity cell, and the remaining digit line pair BLp is coupled to the drain nodes of the enhancement type switching transistors of the horizontal parity cells RP0 to RPn.

If one of the word lines WL0 to WLp is energized, the enhancement type switching transistors of the associated memory cells and the enhancement type switching transistors of the associated horizontal parity cell or the enhancement type switching transistors of the vertical parity cells concurrently turn on so as to couple the digit line pairs BL0 to BLp to the flip flops of the associated cells.

The semiconductor static random access memory device further comprises a charging circuit 2 implemented by a plurality of pairs of enhancement type charging transistors Q1/Q2 coupled between a power voltage line Vdd and the digit line pairs BL0 to BLp. The charging circuit 2 supplies current to the digit line pairs BL0 to BLp, and allows the digit line pairs BL0 to BLp to propagate data bits or parity bits in the form of potential difference.

The semiconductor static random access memory device further comprises a row address buffer circuit 3 coupled to address pins 3a, a row address decoder/word line driver unit 4 coupled between the row address buffer circuit 3 and the word lines WL0 to WLp, a column address buffer circuit 5 coupled to address bits 5a, a column address decoder/selector unit 6 coupled to the column address buffer circuit 5 and the digit line pairs BL0 to BLp, an input/output controlling circuit 7 coupled to an input and output data port 7a and a data bus 8 coupled between the input/output controlling circuit 7 and the column address decoder/selector unit 6. In this instance, the word lines WL0 to WLp, the digit line pairs BL0 to BLp, the row address buffer circuit 3, the row address decoder/word line driver unit 4, the column address buffer circuit 5 and the column address decoder/selector unit 6 as a whole constitute an addressing system.

The row address buffer circuit 3 temporarily stores row address bits supplied to the address pins 3a, and supplies the row address predecoded signals 3b to the row address decoder/word line driver unit 4. The row address decoder/word line driver unit 4 decodes the row address predecoded signals 3b, and selectively energizes the word lines WL0 to WLp. The energized word line couples the digit line pairs BL0 to BLp to the flip flops of the associated cells.

The column address buffer circuit 5 temporarily stores the column address bits, and produces the column address predecoded signals 5b. The column address decoder decodes the column address predecoded signals 5b, and causes the selector to couple a selected digit line pair to the data bus 8.

The semiconductor static random access memory device selectively enters into a write-in mode and a read-out mode. In the write-in mode, a write-in data bit is supplied from the input/output data port 7a to the input/output controlling circuit 7, and the input/output controlling circuit 7 produces a potential difference indicative of a write-in data bit, and supplies the potential difference to the data bus 8. On the other hand, a read-out data bit is transferred to the data bus 8, and the input/output controlling circuit 7 produces an output data signal from the potential difference indicative of the read-out data bit.

The semiconductor random access memory device further comprises a mode discriminator 9 coupled to a port 9a for selectively producing a parity generation clock signal CLKpc and an error correction clock signal CLKec, a controller 10 responsive to one of the clock signals CLKpc and CLKec for controlling a parity generation sequence in the parity generating mode and an error correcting sequence in the error correcting mode, an inspection/error correcting unit 11 communicable with the memory cell array 1 and the horizontal/vertical parity cells RP0–RPn and CP0–CPn for the parity bit generation and the error correction and a latch circuit 12 coupled to the inspection/error correcting unit 11 for memorizing a piece of error information indicative of at least one word line coupled to a memory cell storing an error data bit. In this instance, the controller 10, the inspection/error correction unit 11 and the latch circuit 12 as a whole constitute an inspection and correction system.

The port 9a is coupled to an external system, and the status of the port 9a is changeable by the external system. The mode discriminator 9 discriminates predetermined status of the port 9a. Upon discrimination of the predetermined status, the mode discriminator causes the semiconductor static random access memory device to enter into the error correction mode followed by entry into the standard mode and to change from the standard mode to the parity bit generating mode. When an increase of error rate is forecasted, the port 9a is changed to the predetermined status, and the predetermined status causes a change from a standard power source to a backup power source lower in power voltage level than the standard power source. However, while the port 9a is staying outside the predetermined status, neither parity generation clock CLKpc nor error correction clock signal CLKec is produced, and the semiconductor random access memory device repeats the write-in sequence and/or read-out sequence without parity generation/error correction. For this reason, the write-in sequence and the read-out sequence are as short as those of a standard static random access memory device without error self-correction system. The mode discriminator 9 and the port 9a will be described hereinlater in detail.

The controller 10 is responsive to the parity generation clock signal CLKpc in the parity generating mode for controlling the parity generating sequence. In the parity generating sequence, the controller 10 electrically isolates the ports such as the address pins 3a/5a, control port and the data input/output port from external devices, and causes the column address decoder/selector unit 6 to couple all of the digit line pairs BL0 to BLp to the inspection/error correction unit 11. The controller 10 causes the row address decoder/word line driver unit 4 to sequentially energize the word lines WL0 to WLp. While each of the word lines WL0 to WLn are being energized, the controller 10 sequentially supplies gate control signals to the inspection/error correction unit 11, and the data bits are read out from the associated row of memory cells MC00–MC0n/MC10–MC1n, . . . /MCn0–MCnn to the inspection/error correction unit 11 for generating a horizontal parity bit followed by writing the horizontal parity bit to the associated horizontal parity cell. While the row address decoder/word line driver unit 4 is sequentially energizing the word lines WL0 to WLn, the inspection/error correction unit 11 produces vertical parity bits. The vertical parity bits are written into the vertical parity cells CP0 to CPn when the word line WLp is energized. Each of the horizontal parity bits is indicative of correct state of the data bits stored in the associated row of memory cells, and each of the vertical parity bits represents correct state of the data bits stored in the associated column of memory cells.

The controller 10 is further responsive to the error correction clock signal CLKec for controlling the error correction sequence. In the error correcting sequence, the controller 10 electrically isolates the ports again, and causes the column address decoder/selector unit 6 to couple all of the digit line pairs BL0 to BLp to the inspection/error correction unit 11 as similar to the parity bit generating sequence. The controller 10 causes the row address decoder/word line driver unit 4 to sequentially energize the word lines WL0 to WLp. While each of the word lines WL0 to WLn are being energized, the controller 10 sequentially supplies the gate control signals to the inspection/error correction unit 11, and the data bits and the horizontal parity bit are read out from the associated row of memory cells MC00–MC0n/ MC10–MC1n, . . . /MCn0–MCnn and the associated horizontal parity cell to the inspection/ error correction unit 11. The inspection/error correction unit 11 produces pieces of status information indicative of current state of the data bits read out from the row of data bits, and compares the current state with the correct state indicated by the associated horizontal parity bit. If the current state is not matched with the correct state, the inspection/error correcting unit 11 supplies the latch circuit 12 with the row address assigned to the word line coupled to a memory cell storing at least one error bit. While the row address decoder/word line driver unit 4 is sequentially energizing the word lines WL0 to WLn, the inspection/error correction unit 11 further produces pieces of status information respectively indicative of current states of the columns of memory cells. If the current states of the rows of memory cells are matched with the correct states indicated by the horizontal parity bits, all of the data bits stored in the memory cell array I are correct, and the error correction sequence is completed. Then, the controller 10 recovers the ports from the electrically isolated state, and the semiconductor random access memory device returns to the standard mode.

On the other hand, if at least one error bit is detected, the inspection/error correction unit 11 specifies the memory cell or cells storing the error bit or bits. Namely, the word line WLp is energized, and the current states are compared with the correct states represented by the vertical parity bits to see whether to be matched or not. If one of the current states is not matched with the correct state, the inspection/error correcting unit 11 specifies the memory cell storing the at least one error bit in cooperation with the row address stored in the latch circuit, and corrects the error bit. Then, the controller 10 recovers the ports from the electrically isolated state, and the semiconductor static random access memory device returns to the standard mode.

The inspection/error correction unit 11 largely comprises n++b 1 logic sub-units respectively connectable to the digit line pairs BL0 to BLn and a single logic sub-unit connectable to the digit line pair BLp.

The n++b 1 logic sub-units are similar in arrangement to one another, and exclusive-OR gates E1 are shared between every two adjacent logic sub-units. Each of the n++b 1 logic sub-units comprises a sense amplifier SA, an exclusive-OR gate E2, gate units S1, S2, S3 and S4, a latch circuit LC and a write control circuit WD, and the single logic sub-unit comprises a sense amplifier SAP, an exclusive-OR gate E3, a gate unit S5 and a write control circuit WDP.

The sense amplifiers SA, the exclusive-OR gates E1, the gate unit 5 and the write control circuit WDP are used for the generation of the horizontal parity bits, and form in combination a horizontal parity bit generating circuit 11a. The horizontal parity bit generating circuit 11a is enabled in the parity bit generating mode, and the data bits read out from a row of memory cells are exclusive-ORed with one another after the sense amplification. A horizontal parity bit is produced through the sequential exclusive-OR operation on the read-out data bits, and the horizontal parity bit is transferred through the gate unit S5 to the write control circuit WDP. The write control circuit WDP writes the horizontal parity bit to the horizontal parity cell associated with the row of memory cells.

The sense amplifiers SA, the exclusive-OR gates E2, the gate units S1 to S3 and the write control circuits WD form in combination a vertical parity bit generating circuit 11b, and is also enabled in the parity bit generating sequence. The vertical parity bit generating circuit generates the vertical parity bits in parallel to the generation of the horizontal parity bits as follows.

First, the latch circuits LC are set to zero, and the values stored in the latch circuits LC are respectively exclusive-ORed with the data bits read out from the columns of memory cells in synchronism with the sequential selection of the word lines WL0 to WLn. The outputs of the exclusive-OR gates are transferred through the gate units S1 to the latch circuits LC. The vertical parity bits are stored in the latch circuits LC when the word line WLn is selected. The vertical parity bits are transferred from the latch circuits LC through the gate units S3 to the write control circuits WD, and are written into the vertical parity cells CP0 to CPn when the word line WLp is energized.

The sense amplifiers SA, the exclusive-OR gates E1 and the exclusive-OR gate E3 form in combination a horizontal error detection circuit 11c, and is enabled in the error correction mode. When the semiconductor static random access memory device enters into the error correction mode, the exclusive-OR gates E1 sequentially carry out the exclusive-OR operation on the data bits read out from each row of memory cells after the sense amplification, and produce the piece of status information indicative of the current state of the data bits. The exclusive-OR gate E3 compares the piece of status information with the correct state represented by the horizontal parity bit supplied from the associated horizontal parity cell through the sense amplifier SAP. If the current state is matched with the correct state, the exclusive-OR gate E3 keeps a latch control signal LTC in inactive logic "0" level. However, if the current state is not matched with the correct state, at least one error bit is incorporated in the data bits read out from the row of memory cells, and the exclusive-OR gate E3 supplies the latch control signal LTC of active logic "1" level to the latch circuit 12. Then, the latch circuit 12 responds to the latch control signal LTC for storing the row address assigned to the presently energized word line.

The sense amplifiers SA, the exclusive-OR gates E2, the gate units S1, S2 and S4, the latch circuits LC and the write control circuits WD as a whole constitute an error correction circuit 11d, and the error correction circuit 11d cooperates with the error detection circuit 11c for correcting at least one error bit as follows. The latch circuits LC are initially set to zero. While the data bits are sequentially read out from the rows of memory cells, the data bits read out from each row of memory cells are compared with the values stored in the latch circuits LC by the exclusive-OR gates E2 after the sense amplification, and the gate units S1 transfer the new values from the exclusive-OR gates E2 to the latch circuits LC. Upon completion of the sequential comparison, the latch circuits LC store the pieces of status information indicative of the current states of the data bits stored in the columns of memory cells. If the latch circuit 12 does not store a row address, the error correction sequence is completed, and the semiconductor static random access memory device is allowed to return to the standard mode.

However, if the latch circuit 12 stores the row address, the vertical parity bits are read out from the vertical parity cells CP0 to CPn, and are supplied through the sense amplifiers SA to the exclusive-OR gates E2. The correct states respectively indicated by the vertical parity bits are compared with the current states supplied from the latch circuits LC though the gate units S2, and the exclusive-OR gates E2 decide a column or columns of memory cells where at least one error bit or bits are stored. Namely, if the current states are not matched with the correct states, the exclusive-OR gates E2 yield error signals of logic "1" level, and the error signals are stored through the gate units S1 into the latch circuits LC.

Subsequently, the row address decoder/word line driver unit 4 energizes the word line with the row address stored in the latch circuit 12, and the error bit or bits are read out from the associated row of memory cells together with the correct data bits. The error bit or bits and the correct data bits are supplied through the sense amplifiers SA to the exclusive-OR gates E2, and the error signals are supplied from the latch circuits LC through the gate units S2 to the exclusive-OR gates E2. If one of the error signals is logic "0" level indicative of the correct data bits, the exclusive-OR gate supplies the read-out data bit through the gate unit S4 to the write control circuit WD, and the write control circuit WD restores the read-out data bit. However, if the error signal is logic "1" level, the exclusive-OR gate E2 serves as an inverter, and the complementary bit of the read-out data bit is supplied through the gate unit S4 to the write control circuit WD. The write control circuit WD writes the complementary bit to the memory cell, and the error is corrected. The error correction sequence is completed, and the semiconductor static random access memory device returns to the standard mode.

Thus, the inspection/error correction unit 11 only enters into the parity bit generation mode and the error correcting mode only when the mode discriminator 9 forecasts an increase of error rate, and the parity bit generating sequence and the error correcting sequence are not carried out in the standard mode. As described hereinbefore, the error rate in the standard mode is extremely low, and the write-in and the read-out without the parity bit generation/error correction sequences do not deteriorate the reliability of the data bits stored in the memory cell array 1.

Description is hereinbelow made on the mode discriminator 9 and the port 9a in detail. In the following description, three examples are introduced.

FIRST EXAMPLE

The first example of the mode discriminator and the port 9a is implemented by latch circuits respectively coupled to signal pins exclusively used for the parity bit generation mode and the error correction mode. The signal pins are coupled to an external controller such as, for example, a microprocessor. The microprocessor is assumed to form an electronic system together with the semiconductor static random access memory device, a backup power source etc.

When the microprocessor forecasts an increase of error rate, the parity generation clock signal CLKpc is supplied from the microprocessor to the signal pins, and the associated latch circuit transfers the parity generation clock signal CLKpc to the controller 10. After recovery from the error rate increased state, the microprocessor supplies the error correction clock signal CLKec to the signal pin, and the latch circuit relays the error correction clock signal CLKec to the controller 10.

A typical example of the error rate increased state is a power down of the electronic system. If the microprocessor notices a power-off, the microprocessor instructs the semiconductor static random access memory device to carry out the parity bit generating sequence before change from a relatively high standard power voltage to a relatively low power voltage supplied from the backup power source. On the other hand, if the microprocessor notices a power-on, the microprocessor instructs the semiconductor static random access memory device to carry out the error correction sequence before entry into the standard mode.

The error rate is increased with time, and the microprocessor may instruct the semiconductor static random access memory device to carry out the parity bit generation sequence and the error correction sequence at intervals.

SECOND EXAMPLE

Figure 4:
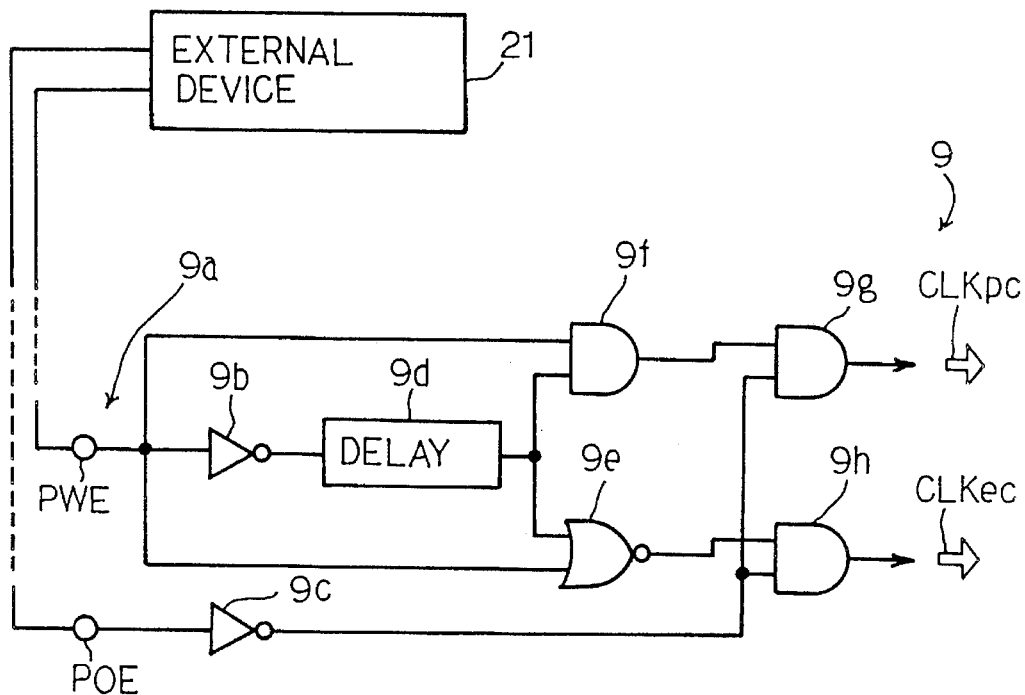
FIG. 4 is a circuit diagram showing a first example of a mode discriminator incorporated in the static random access memory device.

FIG. 4 illustrates the second example of the mode discriminator 9, and the mode discriminator 9 comprises two inverters 9b and 9c, a delay circuit 9d, a NOR gate 9e and three AND gates 9f, 9g and 9h, and external control signal pins PWE and POE form the port 9a. The inverter 9b, the delay circuit 9d and the AND gate 9f as a whole constitute a first one-shot pulse generator, and the inverter 9b, the delay circuit 9d and the NOR gate 9e form in combination a second one-shot pulse generator.

In the standard mode, a write enable signal WE of active low voltage level and an output enable signal OE of the active low voltage level are respectively assigned the external control signal pins PWE and POE. The external control signal pins PWE and POE are selectively driven by an external device 21 such as, for example, a microprocessor in the standard mode. However, when the write enable signal WE is changed, the microprocessor keeps the output enable signal OE in the inactive high voltage level. In the following description, the high voltage level and the low voltage level are assumed to be equivalent to logic "1" level and logic "0" level, respectively.

Figure 5:
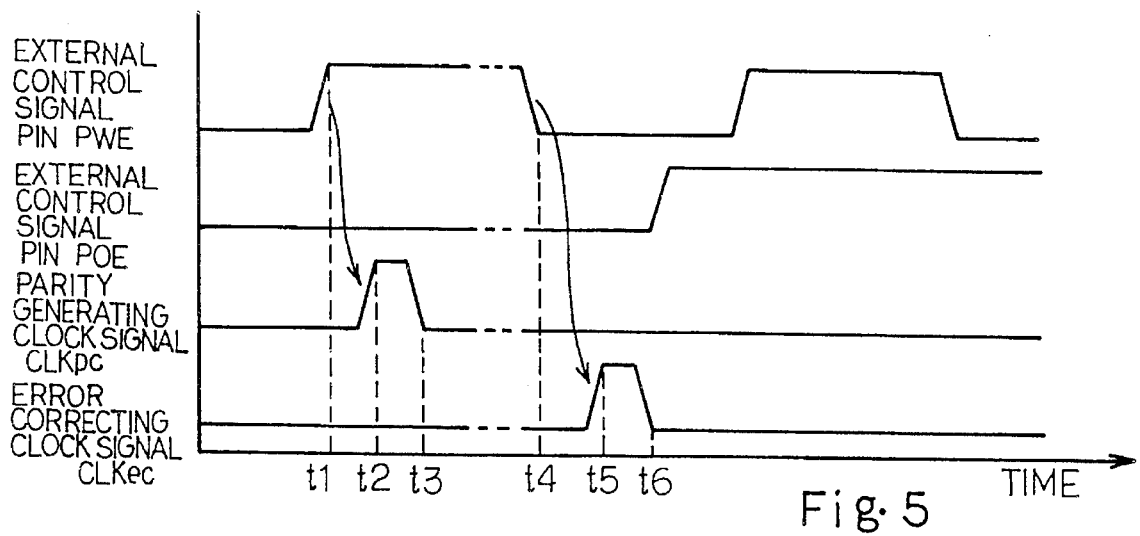
FIG. 5 is a timing chart showing the circuit behavior of the first example of the mode discriminator.

If the microprocessor forecasts an increase of the error rate, the microprocessor keeps the external control signal pin POE to the low voltage level, and changes the external control signal pin PWE to the high voltage level at time t1 as shown in FIG. 5. The low voltage level at the external control signal pin POE is changed to the high voltage level by the inverter 9c, and the AND gates 9g and 9h are enabled. The high voltage level at the external control signal pin PWE disables the NOR gate 9e, and the AND gate 9h does not produce the error correcting clock signal CLKec. On the other hand, the high voltage level at the external control signal pin PWE enables the AND gate 9f, and the output signal of the delay circuit 9d is ANDed with the high voltage level at the external control signal pin PWE. Since the delay circuit 9d keeps the output signal thereof in the high voltage level until the delay time is expired, the AND gate 9f supplies the high voltage level to the AND gate 9g, and the AND gate 9g changes the parity generating clock signal CLKpc to the high voltage level at time t2.

When the delay time is expired, the delay circuit 9d changes the output signal thereof to the low voltage level, and the AND gate 9f changes the output signal to the low voltage level. Accordingly, the AND gate 9g changes the parity generating clock signal CLKpc to the low voltage level at time t3.

Thus, the pulse width of the parity generating clock signal CLKpc is changeable by the delay time.

If the external control signal pin PWE is changed to the low voltage level at time t4, the AND gate 9f is disabled, and the NOR gate 9e is enabled. Accordingly, the AND gate 9g keeps the parity generating clock signal CLKpc in the inactive low voltage level, and the NOR gate 9e causes the AND gate 9h to change the error correcting clock signal CLKec to the active high voltage level at time t5. If the delay time is expired, the AND gate 9h recovers the error correcting clock signal CLKec to the inactive low voltage level at time t6.

Thus, the microprocessor instructs the parity bit generation mode and the error correcting mode through the external control signal pins PWE and POE.

THIRD EXAMPLE

Figure 6:
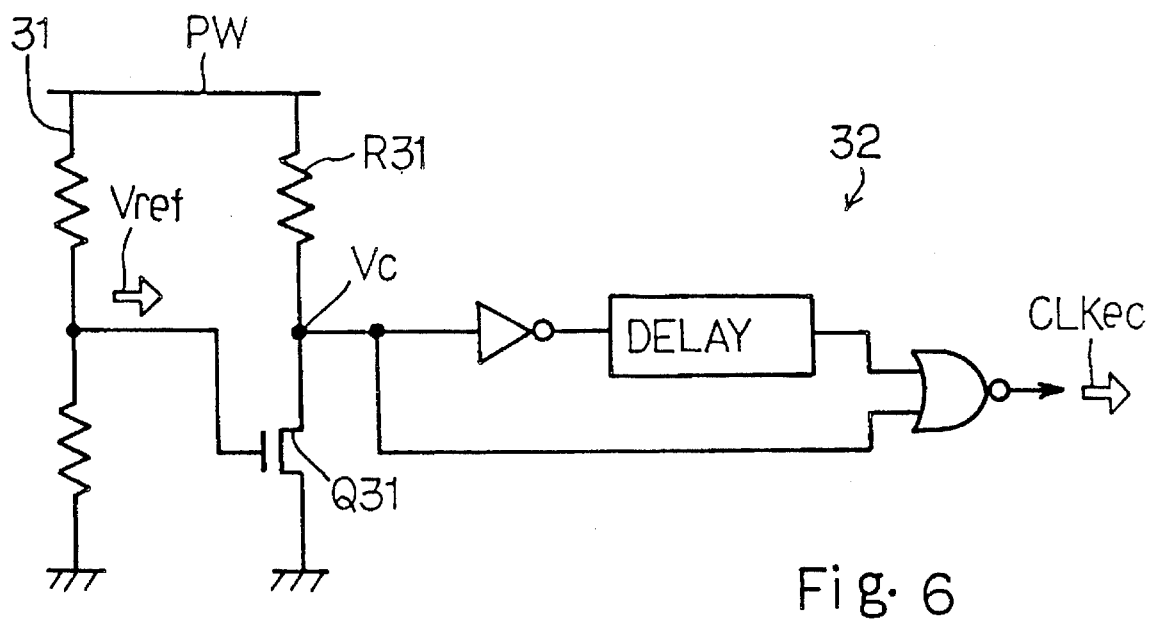
FIG. 6 is a circuit diagram showing a second example of the mode discriminator.

Turning to FIG. 6 of the drawings, the third example of the mode discriminator 9 comprises a voltage divider 31 for producing a reference voltage level Vref, a series combination of a resistor R31 and an n-channel enhancement type switching transistor Q31 and a one-shot pulse generator 32. The series combination of the resistor R31 and the n-channel enhancement type switching transistor Q31 form in combination a voltage comparator. The one-shot pulse generator 32 is similar in circuit arrangement to the combination of the inverter 9b, the delay circuit 9d and the NOR gate 9e. The n-channel enhancement type switching transistor Q31 has a threshold Vth, and the power voltage line PW supplies the power voltage to the voltage divider 31 and the drain node Vc of the n-channel enhancement type switching transistor Q31 through the resistor R31. The port 9a supplies the power voltage to the power voltage line PW.

Figure 7:
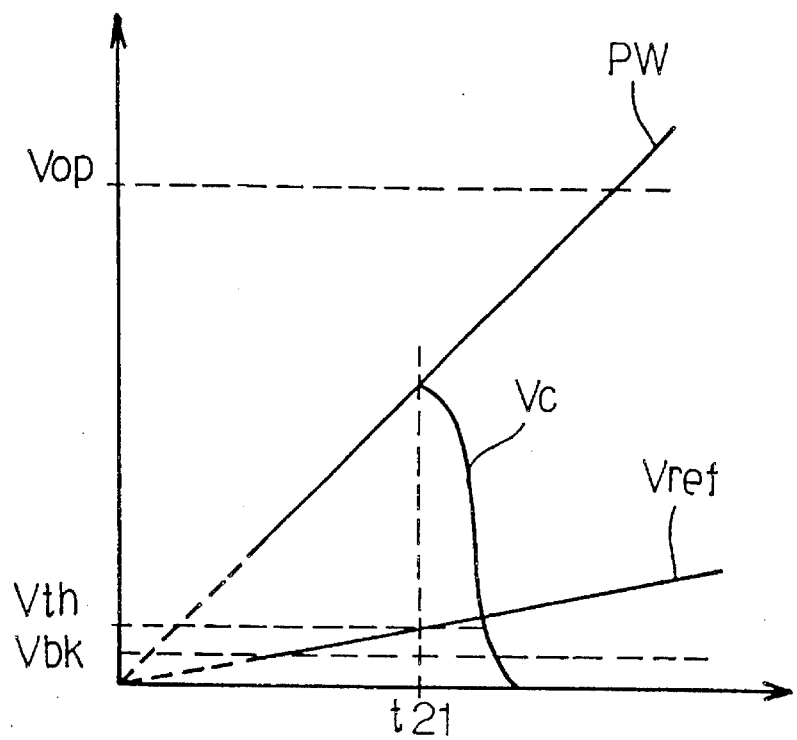
FIG. 7 is a graph showing the circuit behavior of the second example of the mode discriminator.

As shown in FIG. 7, while the reference voltage Vref is lower than the threshold Vth of the n-channel enhancement type switching transistor Q31, the voltage level at the drain node Vc is increased together with the voltage level on the power voltage line PW. However, if the reference voltage Vref exceeds the threshold Vth at time t21, the n-channel enhancement type switching transistor Q31 turns on so that the drain node Vc is decayed. As a result, the NOR gate is enabled, and the one shot pulse generator 32 changes the error correction pulse signal CLKec to the high voltage level. When the delay time is expired, the one-shot pulse generator 32 recovers the error correcting pulse signal CLKec to the low voltage level.

If the threshold Vth is provided between the backup voltage level Vbk and the standard power voltage level Vop, the third example produces the error correcting clock signal CLKec on the way from the backup voltage to and the standard power voltage level Vop. The other clock signal CLKpc may be produced in a similar manner to the first or second example, or horizontal parity bits and vertical parity bits may be produced in every write-in sequence and every readout sequence.

The circuit shown in FIG. 6 may be provided outside the semiconductor chip on which the semiconductor static random access memory device is fabricated.

The preferred embodiment writes and reads out the data bits without parity generation and error correction. However, another embodiment may carry out the parity bit generating sequence after every write-in sequence. In this instance, the error correction is carried out only when the mode discriminator discriminates a request for the error correction.

As will be appreciated from the foregoing description, the semiconductor memory device according to the present invention provides parity bits and corrects error bits when the semiconductor memory device is requested to do so, and the write-in sequence and the read-out sequence are carried out without the parity bit generation and the error correction. For this reason, the semiconductor memory device according to the present invention is writable and readable at high speed without sacrifice of the reliability.

Although a particular embodiment of the present invention has been shown and described, it will be obvious to those skilled in the art that various changes and modifications may be made without departing from the spirit and scope of the present invention. For example, the memory cells and the horizontal/vertical parity cells may be of a dynamic type or an electrically erasable and programmable type, and the semiconductor memory device according to the present invention may form a part of a large scale integration together with other function blocks.

What is claimed is:

1. A semiconductor memory device for selectively entering into a standard mode, an error correcting mode and an inspection bit generating mode, comprising:

a) a memory cell array having a plurality of addressable memory cells for respectively storing data bits, and forming a plurality of memory cell groups, said data bits being repeatedly rewritable and accessible externally of said semiconductor memory device without an error correction in said standard mode;

b) a plurality of addressable status cells selectively associated with said plurality of memory cell groups for respectively storing inspection bits indicative of correct states of said data bits stored in said plurality of memory cell groups;

c) an addressing system selectively making said plurality of addressable memory cells writable and readable in said standard mode, selectively making said plurality of memory cell groups and said plurality of addressable status cells readable and said plurality of addressable memory cells writable in said error correcting mode, and selectively making said plurality of memory cell groups readable and said plurality of addressable status cells writable in said inspection bit generating mode;

d) an interface unit enabled in said standard mode, and operative to receive new data bits from externally and to externally deliver the data bits read out from said memory cell array;

e) an inspecting and correcting system operative to check whether or not at least one data bit is inverted in the memory cells through comparison of the correct states with current states of said data bits respectively stored in said plurality of memory cell groups in said error correcting mode, said inspecting and correcting system being further operative to correct said at least one data bit in said error correcting mode, said inspecting and correcting system further being operative to generate said inspection bits through an inspection of the data bits stored in the associated memory cell groups in said inspection bit generating mode; and f) a mode discriminator coupled to a port changeable in status externally of said semiconductor memory device, and operative to discriminate the status of said port to check whether to cause said semiconductor memory device to enter into said error correcting mode, said mode discriminator further discriminating another status of said port for causing said semiconductor memory device to enter into said inspection bit generating mode, said mode discriminator being coupled to signal pins exclusively assigned to an instruction for entry into said inspection bit generating mode and an instruction for entry into said error correcting mode, said mode discriminator being responsive to said instruction for entry into said inspection bit generating mode for producing a first request signal for an inspection bit generating sequence, said mode discriminator being further responsive to said instruction for said entry into said error correcting mode for producing a second request signal for an error correcting sequence.

2. A semiconductor memory device for selectively entering into a standard mode, an error correcting mode and an inspection bit generating mode, comprising:

a) a memory cell array having a plurality of addressable memory cells for respectively storing data bits, and forming a plurality of memory cell groups, said data bits being repeatedly rewritable and accessible externally of said semiconductor memory device without an error correction in said standard mode;

b) a plurality of addressable status cells selectively associated with said plurality of memory cell groups for respectively storing inspection bits indicative of correct states of said data bits stored in said plurality of memory cell groups;

c) an addressing system selectively making said plurality of addressable memory cells writable and readable in said standard mode, selectively making said plurality of memory cell groups and said plurality of addressable status cells readable and said plurality of addressable memory cells writable in said error correcting mode, and selectively making said plurality of memory cell groups readable and said plurality of addressable status cells writable in said inspection bit generating mode;

d) an interface unit enabled in said standard mode, and operative to receive new data bits from externally and to externally deliver the data bits read out from said memory cell array;

e) an inspecting and correcting system operative to check whether or not at least one data bit is inverted in the memory cells through comparison of the correct states with current states of said data bits respectively stored in said plurality of memory cell groups in said error correcting mode, said inspecting and correcting system being further operative to correct said at least one data bit in said error correcting mode, said inspecting and correcting system further being operative to generate said inspection bits through an inspection of the data bits stored in the associated memory cell groups in said inspection bit generating mode; and f) a mode discriminator coupled to a port changeable in status externally of said semiconductor memory device, and operative to discriminate the status of said port to check whether to cause said semiconductor memory device to enter into said error correcting mode, said mode discriminator further discriminating another status of said port for causing said semiconductor memory device to enter into said inspection bit generating mode said mode discriminator being coupled to a first external control signal pin and a second external control signal pin, both serving as said port, said mode discriminator including a first logic gate coupled to said first external control signal pin for producing an enable signal, a first one-shot pulse generator coupled to said second external control signal pin for producing a first one-shot pulse, a second logic gate coupled to said first one-shot pulse generator and enabled with said enable signal for producing a first request signal for said inspection bit generating mode from said first one-shot pulse, a second one-shot pulse generator coupled to said second external control signal pin for producing a second one-shot pulse, said first one-shot pulse generator and said second one-shot pulse generator being selectively enabled depending upon a potential level at said second external control signal pin, and a third logic gate coupled to said second one-shot pulse generator and enabled with said enable signal for producing a second request signal for said error correcting mode from said second one-shot pulse.

3. A semiconductor memory device for selectively entering into a standard mode, an error correcting mode and an inspection bit generating mode, comprising:

a) a memory cell array having a plurality of addressable memory cells for respectively storing data bits, and forming a plurality of memory cell groups, said data bits being repeatedly rewritable and accessible externally of said semiconductor memory device without an error correction in said standard mode;

b) a plurality of addressable status cells selectively associated with said plurality of memory cell groups for respectively storing inspection bits indicative of correct states of said data bits stored in said plurality of memory cell groups;

c) an addressing system selectively making said plurality of addressable memory cells writable and readable in said standard mode, selectively making said plurality of memory cell groups and said plurality of addressable status cells readable and said plurality of addressable memory cells writable in said error correcting mode, and selectively making said plurality of memory cell groups readable and said plurality of addressable status cells writable in said inspection bit generating mode;

d) an interface unit enabled in said standard mode, and operative to receive new data bits from externally and to externally deliver the data bits read out from said memory cell array;

e) an inspecting and correcting system operative to check whether or not at least one data bit is inverted in the memory cells through comparison of the correct states with current states of said data bits respectively stored in said plurality of memory cell groups in said error correcting mode, said inspecting and correcting system being further operative to correct said at least one data bit in said error correcting mode, said inspecting and correcting system further being operative to generate said inspection bits through an inspection of the data bits stored in the associated memory cell groups in said inspection bit generating mode; and f) a mode discriminator coupled to a port changeable in status externally of said semiconductor memory device, and operative to discriminate the status of said port to check whether to cause said semiconductor memory device to enter into said error correcting mode, said mode discriminator further discriminating another status of said port for causing said semiconductor memory device to enter into said inspection bit generating mode, said mode discriminator including means for producing a first request signal for entry into said inspection bit generating mode, a reference voltage generator coupled to a power voltage line for producing a reference voltage lower than a power voltage on said power voltage line, said power voltage line being supplied from said port with said power voltage level, a voltage comparator operative to compare said reference voltage with a predetermined threshold and to change a voltage level at the output node thereof when said reference voltage exceeds said predetermined threshold, and a one-shot pulse generator operative to produce a second request signal for said error correcting mode.

4. A semiconductor memory device for selectively entering into a standard mode, an error correcting mode and an inspection bit generating mode, comprising:

a) a memory cell array having a plurality of addressable memory cells for respectively storing data bits, and forming a plurality of memory cell groups, said data bits being repeatedly rewritable and accessible externally of said semiconductor memory device without an error correction in said standard mode;

b) a plurality of addressable status cells selectively associated with said plurality of memory cell groups for respectively storing inspection bits indicative of correct states of said data bits stored in said plurality of memory cell groups;

c) an addressing system selectively making said plurality of addressable memory cells writable and readable in said standard mode, selectively making said plurality of memory cell groups and said plurality of addressable status cells readable and said plurality of addressable memory cells writable in said error correcting mode, and selectively making said plurality of memory cell groups readable and said plurality of addressable status cells writable in said inspection bit generating mode;

d) an interface unit enabled in said standard mode, and operative to externally receive new data bits and to externally deliver the data bits read out from said memory cell array;

e) an inspecting and correcting system operative to check whether or not at least one data bit is inverted in the memory cells through comparison of the correct states with current states of said data bits respectively stored in said plurality of memory cell groups in said error correcting mode, said inspecting and correcting system being further operative to correct said at least one data bit in said error correcting mode, said inspecting and correcting system further being operative to generate said inspection bits through an inspection of the data bits stored in the associated memory cell groups in said inspection bit generating mode; and f) a mode discriminator coupled to a port changeable in status externally of said semiconductor memory device, and operative to discriminate the status of said port to check whether to cause said semiconductor memory device to enter into said error correcting mode, said mode discriminator further discriminating another status of said port for causing said semiconductor memory device to enter into said inspection bit generating mode, said semiconductor memory device entering into said inspection bit generating mode before a voltage level on a power voltage line is lower than a standard power voltage level and into said error correcting mode when said voltage level on said power voltage line is recovered from a low power voltage level to said standard power voltage level.

\* \* \* \* \*